United States Patent

Fornasari et al.

[11] Patent Number: 5,730,493
[45] Date of Patent: Mar. 24, 1998

[54] BUILT-IN BABY SEAT FOR TRANSPORT IN VEHICLES

[76] Inventors: Alexandre Antonio Fornasari, Rua Alcides Munhoz, n°., 855 - Mercês - 80.710-030 - Curitiba - PR; Dante Luiz Nascimento Pereira, Jr., Rua Carlos Pioli, n°., 588 - Bom Retiro - 80.520-170 - Curitiba - PR., both of Brazil

[21] Appl. No.: 673,872

[22] Filed: Jul. 2, 1996

[30] Foreign Application Priority Data

Jul. 7, 1995 [BR] Brazil ............................ 95 03 277

[51] Int. Cl.⁶ ................................................ B60N 2/30
[52] U.S. Cl. ................ 297/238; 297/255; 297/256.15
[58] Field of Search ........................ 297/238, 255, 297/256.15

[56] References Cited

U.S. PATENT DOCUMENTS

| | | | |
|---|---|---|---|
| 2,533,527 | 12/1950 | Soltis | 297/256.15 X |
| 2,633,906 | 4/1953 | Franz | 297/255 X |
| 2,723,709 | 11/1955 | Welsh | 297/255 |
| 2,966,201 | 12/1960 | Strahler | 297/238 |
| 3,146,026 | 8/1964 | Berlin | 297/255 |
| 4,230,366 | 10/1980 | Ruda | 297/238 X |
| 4,435,011 | 3/1984 | Hakamata | 297/238 X |
| 4,540,216 | 9/1985 | Hassel, Sr. | 297/238 |
| 4,749,229 | 6/1988 | Dorto | 297/238 |
| 5,222,641 | 6/1993 | Medeiros, Jr. | 297/255 X |
| 5,362,123 | 11/1994 | Simmons | 297/255 X |
| 5,383,707 | 1/1995 | Osenkowski et al. | 297/238 |
| 5,429,414 | 7/1995 | Olsson et al. | 297/238 |
| 5,474,357 | 12/1995 | Dukatz et al. | 297/238 |

FOREIGN PATENT DOCUMENTS

| | | | |
|---|---|---|---|
| 0184035 | 10/1984 | Japan | 297/238 |
| 6016079 | 1/1994 | Japan | 297/238 |
| 6286509 | 10/1994 | Japan | 297/238 |

*Primary Examiner*—Peter M. Cuomo
*Assistant Examiner*—David E. Allred

[57] ABSTRACT

A built-in baby seat including a retractable seat, which can be made of fabric, leather, synthetic leather, plastic, or any other similar material. The seat includes a mounting bar that can be shaped as a semiarch, a semicircle, a semiquadrangle, a semirectangle or semitriangle. The bar is made of iron, aluminum, plastic or any similar material, and is covered with plastic foam and/or rubber, which is in turn covered with some finishing material (leather, fabric, synthetic leather, plastic, or the like).

3 Claims, 4 Drawing Sheets

BUILT-IN BABY SEAT FOR TRANSPORT IN VEHICLES

BACKGROUND AND SUMMARY OF THE INVENTION

The present invention is a built-in seat for babies. The seat is mounted inside the back seat of cars, in buses, in planes and/or any other vehicles that need to transport children with more safety, comfort and versatility than is available with standard seats.

Presently in the market, chairs to transport children in automobiles are available. The chairs offer added comfort and some safety. However, there is an inherent inconvenience with these chairs due to their occupying a large amount of space in the vehicle. This causes difficulties in installing and removing the seat when there is not need for its use. The seats currently in the market are heavy and large.

In order to eliminate the shortcomings of the prior art, we have developed the following invention: a simple device that is built into a seat of a vehicle. The device occupies less space, and has the advantage of being practical. The seat features safety and comfort for the child and other passengers in the vehicle.

The present invention is a device built inside a seat back of a vehicle, intended to come manufactured from the factory. The seat has the advantages of being easy to activate when it is needed, and easy to deactivate when additional space is required.

The built-in seat comprises a retractable seat, which can be made of fabric, leather, synthetic leather, plastic, or any other similar material that presents safety, comfort and resistance. The seat includes a mounting bar that can be shaped as a semiarch, a semicircle, a semiquadrangle, a semirectangle or a semitriangle without altering the mechanism of the invention. The bar is made of iron, aluminum, plastic or any similar material, and is covered with plastic foam and/or rubber, which is in turn covered with some finishing material (leather, fabric, synthetic leather, plastic, or the like).

The seat includes a retractable seat anatomically shaped, which can also be made of fabric, leather, synthetic leather, plastic, or any similar material. The retractable seat is affixed to the mounting bar.

In invention will be better understood through the detailed description and better visualized through the annexed drawings.

DETAILED DESCRIPTION OF THE PREFERRED EMBODIMENT

Figure 1:
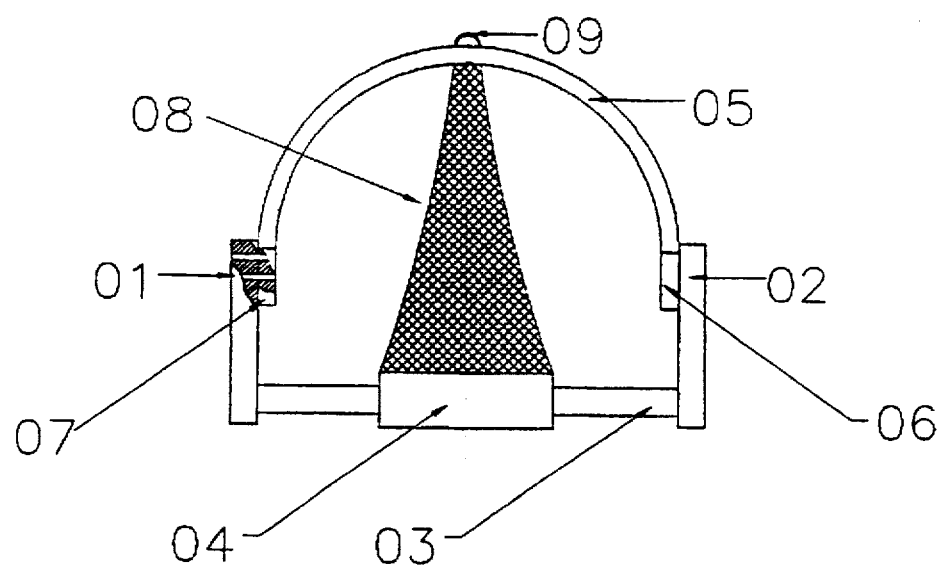
FIG. 1 is a top plan view of the baby seat of the present invention.
Figure 2:
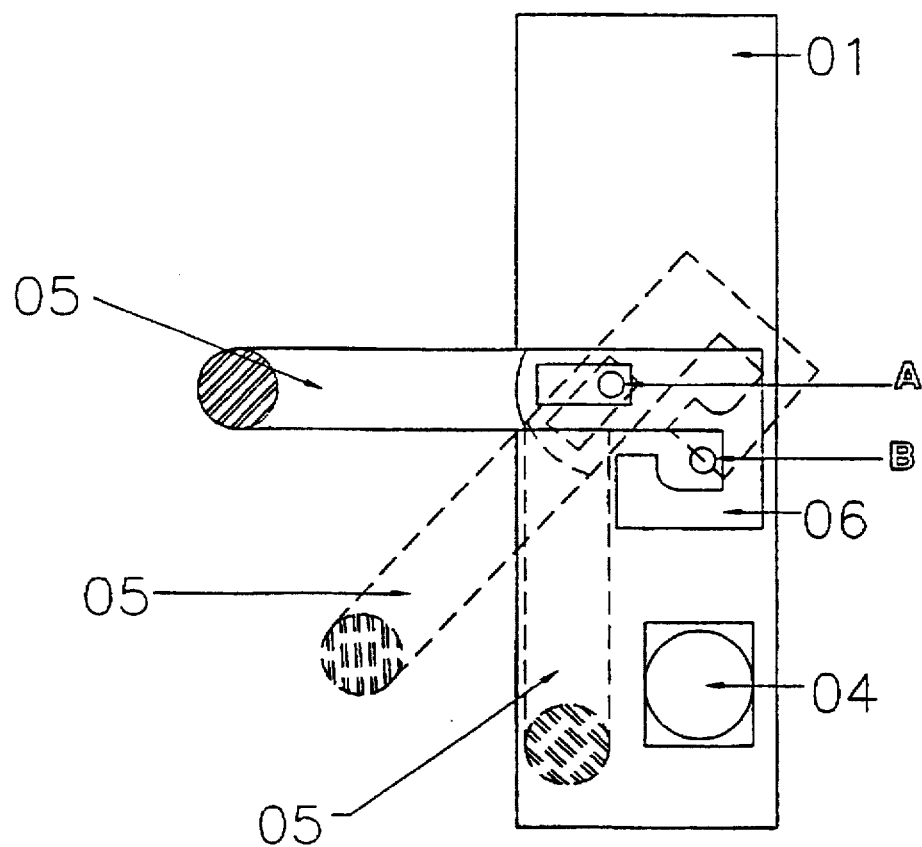
FIG. 2 is a side view of the baby seat of the present invention.
Figure 3:
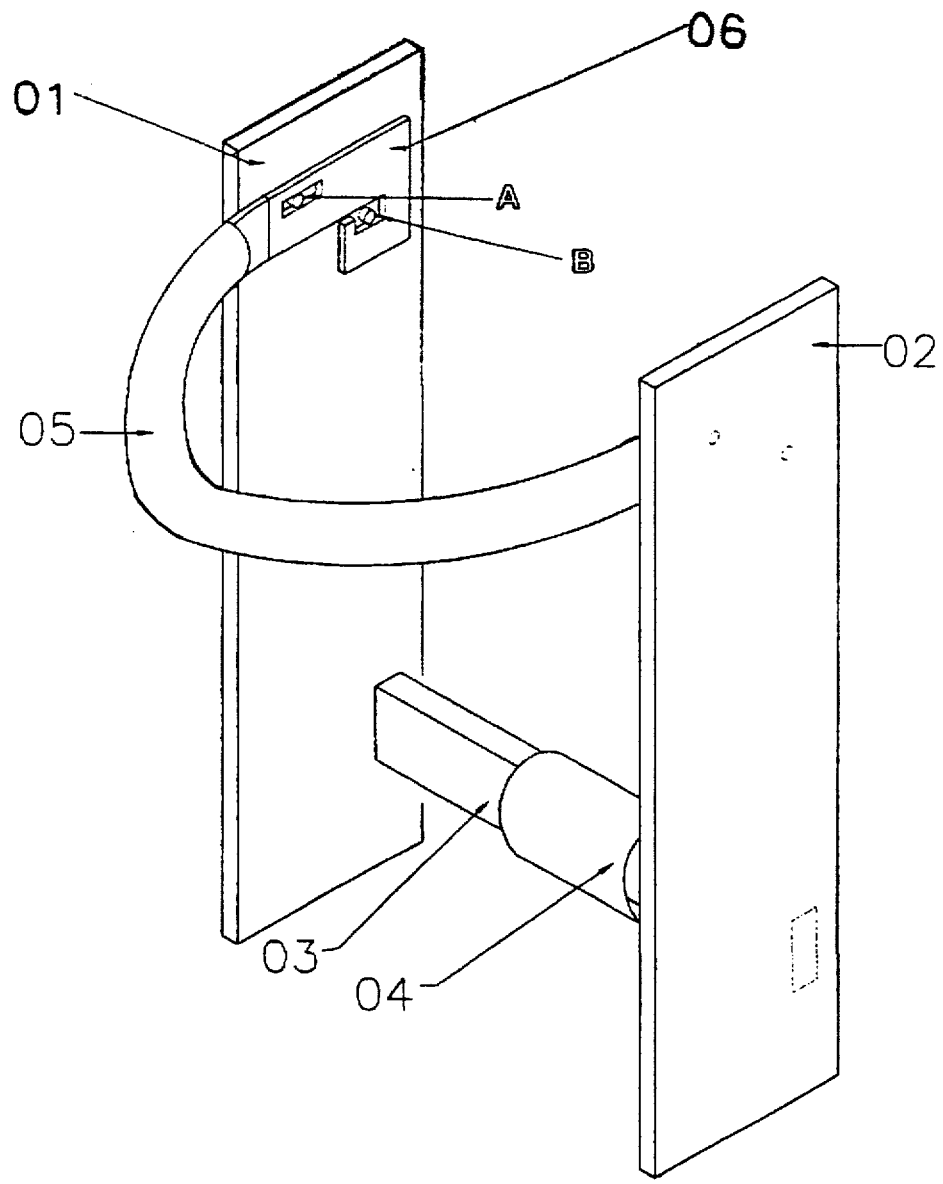
FIG. 3 is a perspective view of the support frame of the baby seat.
Figure 4:
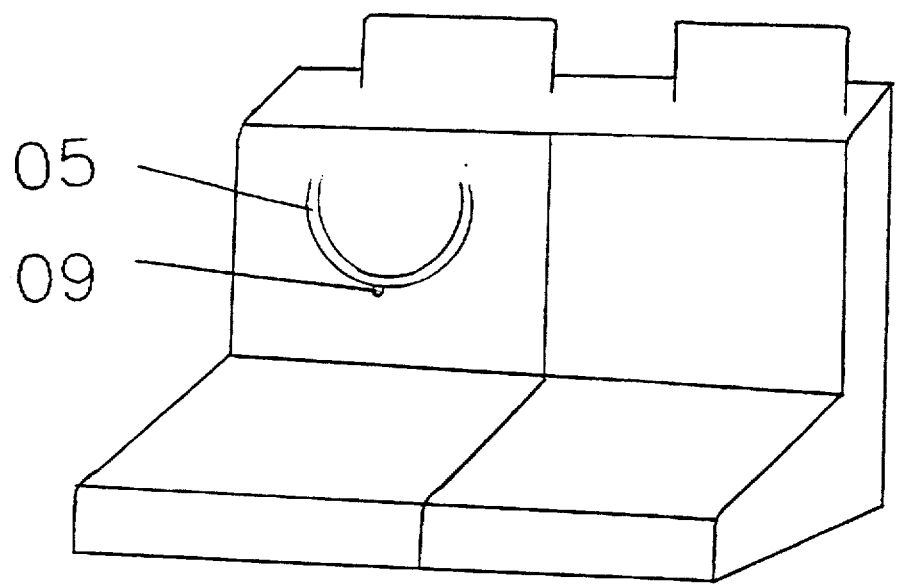
FIG. 4 shows the seat in a rear seat of a car and in the stowed position.

The built-in baby seat of the present invention comprises two parts. The first part is exposed in the back seat of the vehicle. The seat comprises a retractable anatomic seat 8, linked to a covered mounting bar 5 that supports it. The mounting bar 5 attaching plates 6 and 7. The seat also includes safety belts. The second part of the seat is embedded in the vehicle seat back and comprises two vertical bars 1 and 2.

Perpendicular to the two vertical bars is a third bar 3 that supports the retraction mechanism 4. The retraction mechanism 4 is linked to the covered mounting bar 5, a pull cord 9 is attached to the mounting bar 5 to allow a user to easily deploy the seat.

The two attaching plates 6 and 7 pivot around axis "A". Recesses in the lower portions of the attaching plates 6 and 7 are adapted to lock onto retaining projections "B" when the seat is moved to the fully deployed position.

To deploy the seat, a user pulls the mounting bar 5 upward by the pull cord 9 that is affixed to the mounting bar 5. The user pulls the mounting bar 5 to about 2 cm beyond 90 degrees relative to the vertical bars. The seat is then pulled to the front and returned to the 90 degree position. The seat 8 will then support a child.

To stow the seat, the user pulls upward on the mounting bar 5 to about 2 cm beyond ninety degrees relative to the vertical bars and pushes the mounting bar rearwardly. The baby seat can then be stored in the seat back of the vehicle.

We claim:

1. A built-in baby seat for a vehicle comprising:

a retractable seat, a mounting bar with attaching plates at each end of said mounting bar, said retractable seat is affixed to and supported by said mounting bar, first and second vertical bars, a third bar perpendicular to said first and said second vertical bars, said first, second, and third bars forming a framework in which is mounted said retractable seat, said framework is contained within an interior of a seat back of the vehicle, and a retraction mechanism linked to said third bar and to said retractable seat; wherein said attaching plates are supported at and pivot around an axis perpendicular to and extending through said two vertical bars, a recess spaced from said axis and positioned in a lower portion of each of said attaching plates receives a retaining projection of each of said vertical bars when said mounting bar with said retractable seat is moved to a fully deployed position, said recesses are removed from said retaining projections by first slightly raising and pushing rearwardly said mounting bar to release said retaining projections, then lowering said mounting bar to place said baby seat in a retracted position in which said baby seat is contained within the seat back of the vehicle, to deploy said baby seat, a user pulls said mounting bar upward to a position slightly past horizontal and pulls said mounting bar to the front to allow said recesses to engage said retaining projections, said baby seat then being locked in the fully deployed position.

2. The built-in baby seat defined in claim 1, wherein:

said mounting bar is covered by a resilient shock-absorbing material.

3. The built-in baby seat defined in claim 1, wherein:

a pull cord is affixed to said mounting bar.

* * * * *